United States Patent
Aronne

[11] Patent Number: 5,362,016
[45] Date of Patent: Nov. 8, 1994

[54] PARACHUTE DEPLOYMENT SYSTEM AS A FUNCTION OF EJECTED PILOT SEAT SPEED

[76] Inventor: Armand J. Aronne, 328 Riviera Dr., S. Massapequa, N.Y. 11758

[21] Appl. No.: 973,714

[22] Filed: Nov. 9, 1992

[51] Int. Cl.$^5$ ............................................. B64D 17/74
[52] U.S. Cl. ........................ 244/122 AE; 244/122 AF
[58] Field of Search ............... 244/140, 141, 152, 147, 244/149, 122 A, 122 AE, 122 AF, 150; 73/861.76, 861.24, 178 R, 826.61, 189, 184, 862.65

[56] References Cited
U.S. PATENT DOCUMENTS

| | | | |
|---|---|---|---|
| 3,862,731 | 1/1975 | McIntyre | 244/122 A |
| 4,505,444 | 3/1985 | Martin | 244/122 AE |
| 4,792,903 | 12/1988 | Peck et al. | 244/122 AE |
| 4,911,382 | 3/1990 | Aronne | 244/122 AE |
| 5,104,066 | 4/1992 | Aronne | 244/122 AE |

*Primary Examiner*—David A. Bucci
*Assistant Examiner*—Anne E. Bidwell
*Attorney, Agent, or Firm*—Pollock, Vande Sande & Priddy

[57] ABSTRACT

An ejected pilot's seat deploys a drogue chute shortly upon ejection so as to slow the pilot's seat. A strain gauge is connected in line with a drogue chute to sense the load thereon. The load corresponds to speeds at which the ejected seat travels. As the ejected seat slows, the first possible safe speed for main parachute deployment is detected and a sequence controller causes rotation of a rotary solenoid shaft. The shaft displaces a mechanical stop for a parachute deployment timer. The main parachute is deployed shortly upon actuation of the parachute deployment timer. The result is main parachute deployment as soon as the ejected seat has reached a safe deployment speed, as opposed to after a longer fixed interval of time. This maximizes the altitude of descent for an ejected pilot, thereby increasing his safety factor for descent.

2 Claims, 1 Drawing Sheet

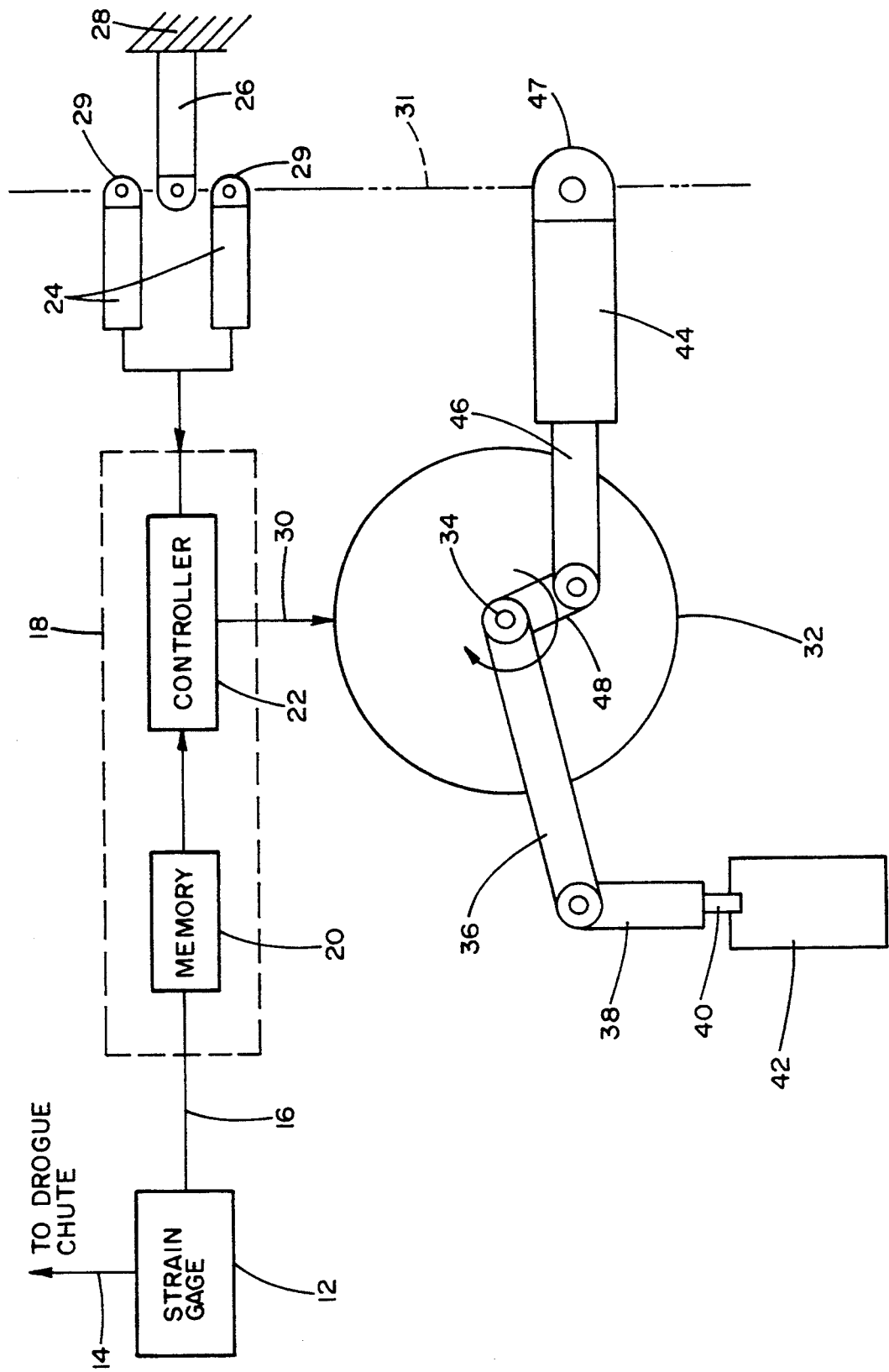

PARACHUTE DEPLOYMENT SYSTEM AS A FUNCTION OF EJECTED PILOT SEAT SPEED

FIELD OF THE INVENTION

The present invention relates to pilot parachute systems, and more particularly to a control system for deploying the parachute after ejection.

BACKGROUND OF THE INVENTION

The present pilot ejection seats for high-speed military aircraft typically include a drogue chute which becomes shortly deployed upon ejection so as to slow the ejected seat. Thereafter, a preset time delay passes before the seat harnesses release the pilot and a main parachute is deployed for the pilot's descent. For typical applications, under 15,000 feet of altitude, the timing for parachute deployment remains the same whether the seat is traveling at low speed or at a relatively high speed such as 600 knots. This time interval is typically 2.0 seconds. Such a fixed time delay feature adversely affects the safety performance of a seat travelling at less than 600 knots since the parachute could be deployed earlier, which could mean the difference between escape success or failure. It would be desirable to follow the basic tenet of optimum ejection seat design, which is to deploy the parachute as quickly as possible without hurting pilot or parachute.

BRIEF DESCRIPTION OF THE PRESENT INVENTION

The present invention offers an improvement to existing ejection seats by monitoring the speed of the pilot's seat after ejection and causing parachute deployment at the first possible moment, when the drogue chute has slowed the pilot to a safe speed for deployment. Accordingly, the parachute will be safely deployed at an optimum moment, regardless of whether the aircraft was flying at high or low speed, just before ejection. The earliest possible ejection will add altitude for a safer pilot descent. The present utilization of a fixed time delay before parachute deployment may still be utilized as a back-up device, where the fixed time represents a maximum period in case the constantly monitored speed system experiences a failure.

BRIEF DESCRIPTION OF THE FIGURE

The above-mentioned objects and advantages of the present invention will be more clearly understood when considered in conjunction with the accompanying drawings, in which the figure is a schematic diagram of the present invention.

DETAILED DESCRIPTION OF THE INVENTION

The figure is a schematic representation of the present invention and sets forth the apparatus for deploying a main parachute of an ejection seat assembly of conventional design. It is to be understood that the apparatus represented in the figure comes into play after ejection and after deployment of a drogue chute in accordance with conventional operation.

A strain gauge 12 is mechanically linked to a drogue chute, as indicated by reference number 14. The output of the strain gauge 12 is connected to a microprocessor 18 for monitoring the output of the strain gauge and developing a correlation between the electrical output from the strain gauge and a corresponding speed of an ejected seat to which the drogue chute is attached. This is accomplished by connecting the output of the strain gauge to an ROM memory 20 which stores a look-up table for establishing ejected pilot seat speed as a function of load on the drogue chute, the latter being sensed and measured by the connected strain gauge 12. The utilization of a strain gauge for monitoring ejected seat speed is disclosed in my U.S. Pat. No. 5,104,066.

The present invention utilizes the calibrated speed from memory 20 to actuate a controller 22 for initiating parachute deployment at the first possible safe moment. A drogue chute slows the ejected seat until the main parachute may be safely deployed. To deploy a main parachute at an earlier moment may cause it to tear and injure the ejected pilot by severe jolting.

The microprocessor 18 has a preselected calibrated speed established for generating an output 30 at the controller 22. Low levels of electrical power are furnished to the strain gauge and microprocessor components by conventional thermal batteries 24 which become energized when a trip rod 26 pulls on an actuating plunger 29 of each of the batteries. As will be seen in the figure, the right illustrated end of the trip rod is secured to the airplane and the left indicated end is connected to the actuating plungers 29 of the thermal batteries by means of a frangible connection, as indicated by reference numeral 31. Upon ejection, the trip rod 26 pulls the thermal battery actuating plungers and electrical current begins to power the strain gauge 12 and the components of microprocessor 18.

An output from controller 22 powers a rotary solenoid 32, and more particularly the shaft 34. Rotation of the shaft causes linked rotation of crank arm 36 and link 38. An outer end of link 38 has a pin extension 40 which serves as a mechanical stop for a conventional parachute deployment timer 42. The timer 42 begins the mechanical actuation of parachute deployment in a conventional manner. However, as will be appreciated, the controller output 30 begins the parachute deployment mode immediately upon sensing slowdown of the ejected seat to a safe parachute deployment speed.

As a backup device for increasing the reliability of safe parachute ejection, a pyrotechnic delay 44 is provided for displacing the pin 40 from the parachute deployment timer 42. The pyrotechnic delay is a conventional device which initiates the operation of timer 42 in a conventional manner. The pyrotechnic delay 44 must travel with the deployed ejection seat and includes an actuator 47 which is linked to the trip rod 26 by frangible connection 31 and is actuated when the trip rod is severed from the delay 44. Upon such severance, the pyrotechnic device begins a delay interval during which time an output from controller 22 would ordinarily occur. However, if a failure in the speed sensing system occurs, the pyrotechnic delay 44 will become energized at the end of a fixed time interval and cause translation of plunger 46. The plunger is connected to a crank arm 48 which in turn is linked to the shaft 34 of the rotary solenoid 32. Translation of plunger 46 will therefore cause rotation of the shaft and consequently link 38. Displacement of the extension pin 40 thus results in the beginning of a parachute deployment cycle for timer 42 in an equivalent manner, as previously described.

Accordingly, as will be appreciated from the foregoing description, the present invention maximizes the safety margin afforded an ejected pilot.

It should be understood that the invention is not limited to the exact details of construction shown and described herein for obvious modifications will occur to persons skilled in the art.

I claim:

1. An apparatus for deploying a parachute from an ejected pilot's seat comprising:

a strain gauge connected to a deployed drogue chute;

means for matching the strain gauge output with pre-stored corresponding seat speeds;

controller means for detecting the occurrence of an optimum declining seat speed at which a main parachute may be safely deployed;

a device member;

an electromagnetic device connected at its electrical input to an output of the controller means for causing physical displacement of said device member; and a parachute deployment timer having its actuator connected to said device member, the timer performing a fixed timing interval upon displacement of said device member and the connected actuator.

2. An apparatus as set forth in claim 1 wherein:

the electromagnetic device further comprises:

a rotary solenoid having an output shaft;

a linkage connected between the shaft and the timer actuator; and further wherein the apparatus further includes a fail safe device which has an independent time delay, commencing with seat ejection; and means connecting the fail safe device to the shaft for causing physical displacement of the device member and the connected actuator in the event the electromagnetic device fails.

* * * * *